4 Sheets—Sheet 3.
J. H. JONES.
Seeding Machine.
No. 233,517. Patented Oct. 19, 1880.
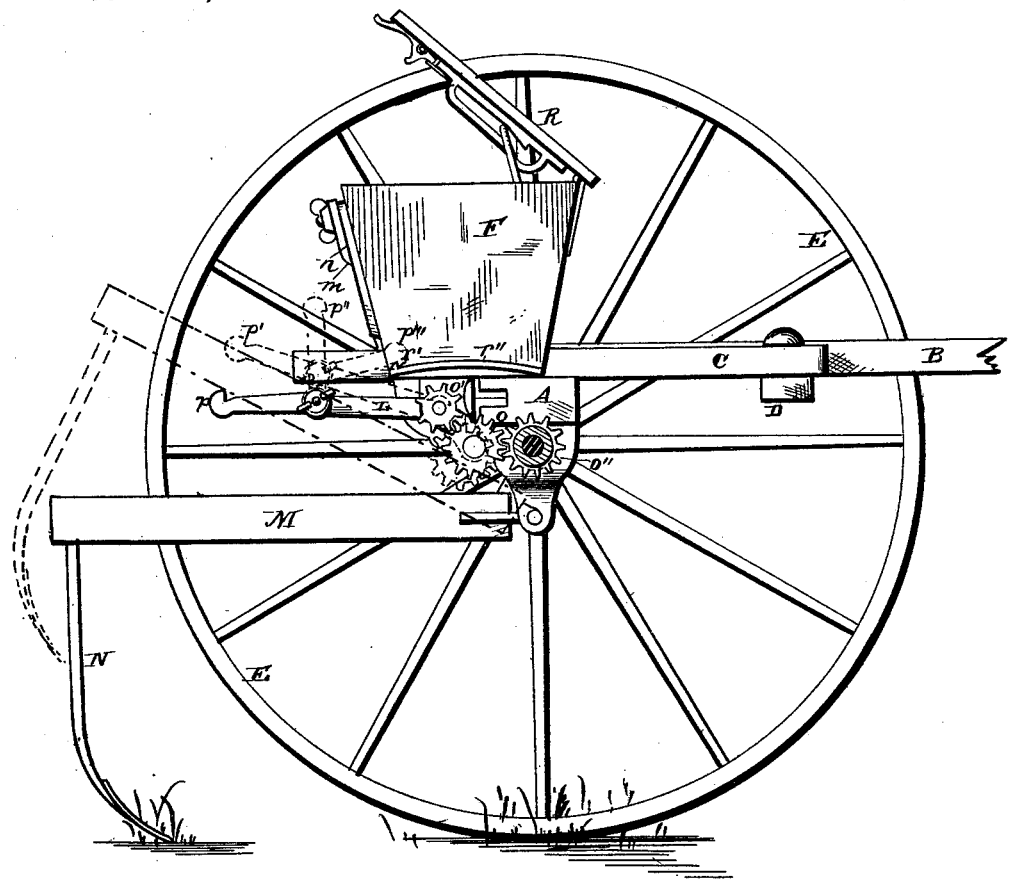
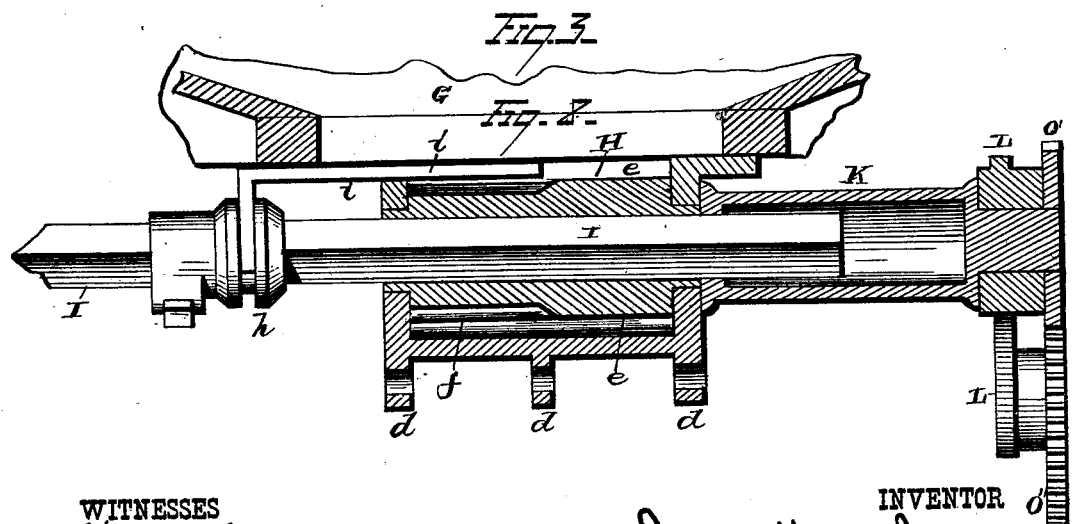
WITNESSES
INVENTOR

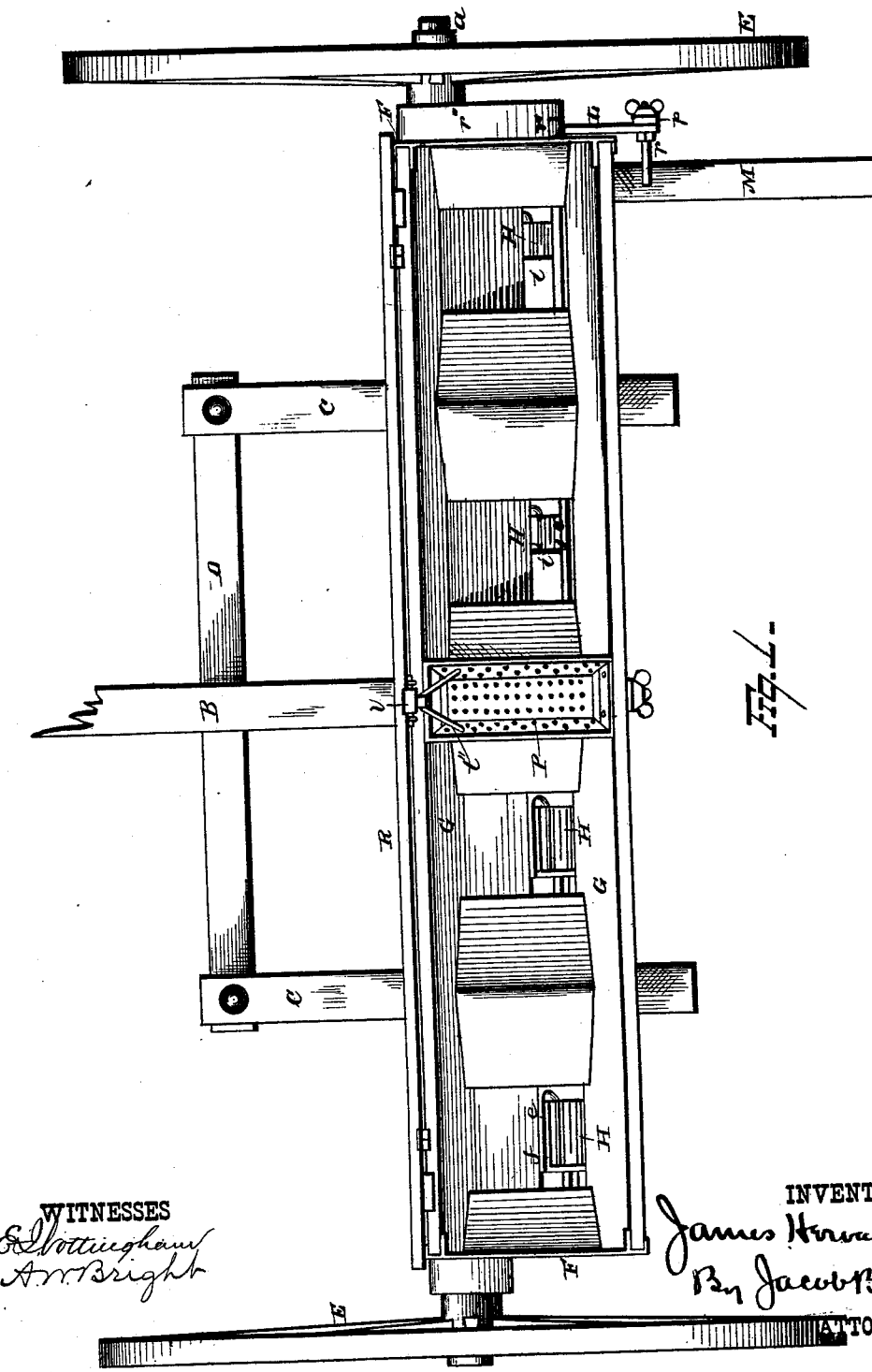

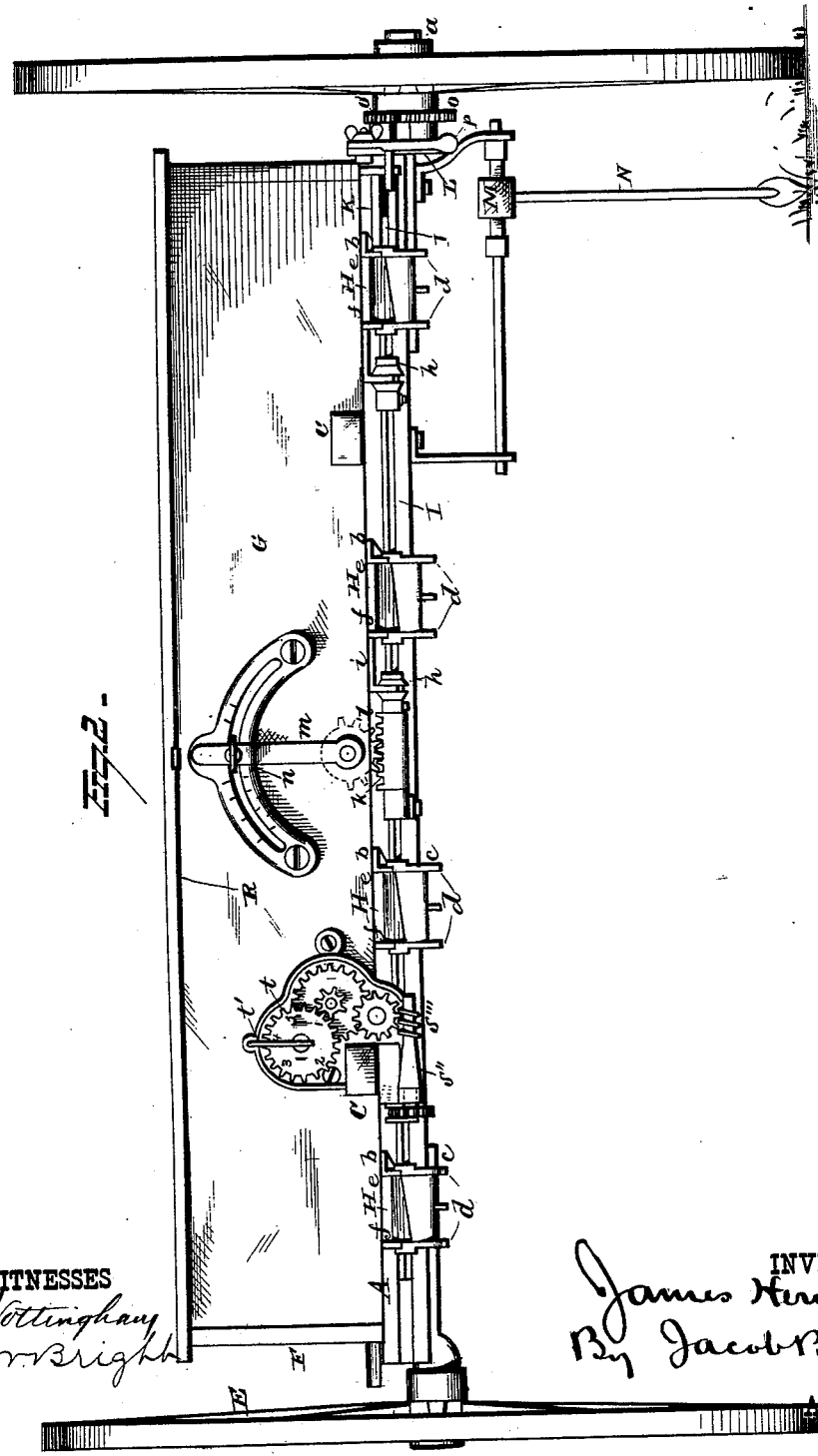
J. H. JONES.
Seeding Machine.
No. 233,517. Patented Oct. 19, 1880.

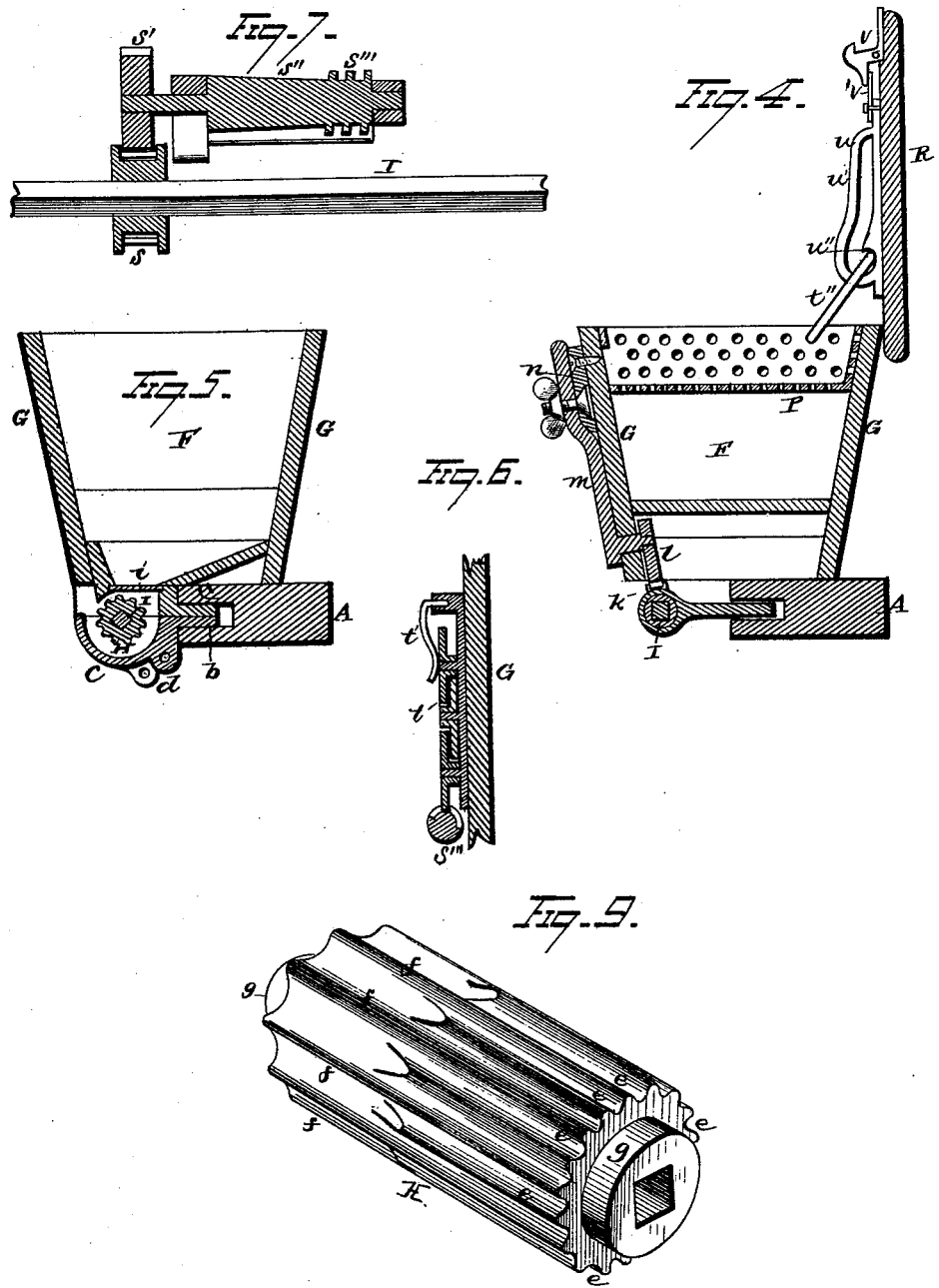
J. H. JONES.
Seeding Machine.
No. 233,517.  Patented Oct. 19, 1880.

UNITED STATES PATENT OFFICE.

JAMES H. JONES, OF ROCKFORD, ILLINOIS.

SEEDING-MACHINE.

SPECIFICATION forming part of Letters Patent No. 233,517, dated October 19, 1880.

Application filed February 27, 1880.

*To all whom it may concern:*

Be it known that I, JAMES HERVA JONES, of the city of Rockford, county of Winnebago, and State of Illinois, have invented a new and useful Seeding-Machine, of which the following is a specification.

My invention relates to that class of seeding-machines known in the trade as "force-feed broadcast seeding-machines and cultivators combined;" and the object of my improvement is to provide a reliable force-feed seeding device capable of giving uniform results in the distribution of the various kinds of seed to be sown by this class of machines; to so connect the seeding device with the carrying-wheels that in the forward movement of the machine it will operate to distribute the seed; to connect the seeding device with the movement of the machine in such a manner that the backward movement of the machine will not distribute the seed; to so connect the seeding device with the drag-bars as to stop the distribution of seed when the bars are suspended for transportation; to provide means by which the seeding device may be employed to distribute the seed independent of the cultivator; to provide means by which the cultivator may be employed independent of the seeding device; to provide means by which the distribution of the seed by the several seeding-rollers may be simultaneously adjusted uniformly; to provide, in connection with the adjusting mechanism to the seed-rollers, an index to indicate the quantity of seed distributed to a given area; to provide a land-measuring device, in connection with the seeding mechanism, to indicate the area over which the seed has been distributed, having a rotating dial held in the gear-train in an adjustable manner by means of an index-finger. These and other improvements to be hereinafter described constitute the subject-matter of this specification.

In the accompanying drawings, Figure 1 is a plan view of my improved seeding-machine, showing the hopper open with the lid in a vertical position. Fig. 2 is a rear elevation; Fig. 3, an end elevation. Fig. 4 is a central transverse vertical section; Fig. 5, a transverse vertical section of the lower portion of the hopper, cut centrally through the feed-roller. Fig. 6 is a central transverse vertical section through the gear-train and index-finger of the land-measuring device. Fig. 7 is a horizontal lengthwise section of the gear-connection of the land-measuring device with the shaft carrying the feed-roller. Fig. 8 is a lengthwise vertical central section of the feed-rolls, adjustable feed-regulating slide, and their connection with seed-hopper. Fig. 9 is an isometrical representation of a feed-roll enlarged.

The main frame of my improved seeding-machine is composed mainly of a suitable axle-beam, A, rectangular in cross-section, having fixed to the center of its length a tongue, B, projecting forward therefrom. C are beams, rectangular in cross-section, and are fixed to the axle-beam on its quarter-centers, one on each side of the tongue, parallel therewith, and extend forward and rearward of the axle-beam, and their forward ends, with the tongue, are connected by a beam, D, placed parallel to the axle-beam. These parts, constructed and joined as represented, constitute the main frame. To the ends of the axle-beam are fixed axle-arms *a*, fitted to receive the carrying-wheels E, to revolve freely thereon. On this main frame, supported on the carrying-wheels, is mounted a seed-hopper, composed mainly of the ends F and flaring sides G, and of such width and placed thereon in such a manner as to extend rearward of the axle-beam to permit the seeding device to be placed in the angle formed by the overhanging hopper, and the rear edge of the axle-beam is provided with a groove, for a purpose which will hereinafter appear.

The cases of the seed-distributing rollers, in this instance, are composed of two parts, *b* and *c*, and are fitted with journal-bearings to receive the journal ends of the seed-rollers, to permit them to revolve therein freely. The two portions forming these cases are each provided with a radially-projecting flange adapted to enter the groove formed in the rear edge of the axle-beam, and the parts, when fitted with the seed-roller and suitably fixed to each other, are placed at proper intervals on the machine, in the angle formed by the rear edge of the axle-beam and the overhanging seed-hopper, in such a manner that their flanged portion shall enter the groove in the edge of the axle-beam, and their upper and forward portions are of proper form to meet the face of the seed-box and axle-beam, forming the angle in which they are placed, and are suitably fixed in position thereto. The upper portion of these seed-roll cases opens directly into the seed-box, each division of which is fitted with inclined hopper-bottoms to conduct the seed onto the seed-rollers in the roll-cases. The rear portion of these roll-cases are fitted with delivery-openings, the delivery-edge of which is inclined to the axis of the rollers, to insure a uniform delivery of the seed. These cases are also provided with depending ears, (represented at $d$,) which are perforated to fit them to receive a suitable scattering device to distribute the seed discharged by the seed-rolls.

The seed-distributing rollers, as represented at H, are cylindrical in form, having a portion of their cylindrical surface provided with suitable-sized flutings $e$, which, in connection with an adjustable seed-regulating slide, will distribute the smaller seeds in proper quantities, and a portion of these rollers are provided with enlarged flutings $f$, to properly distribute seeds which require to be sown in large quantities. The ends of these rollers are fitted with journals $g$, having their bearings in the ends of the roll-cases, in which they revolve freely. They are also fitted with axial openings $g$, rectangular in cross-section, to receive a square shaft, I, to slide endwise therein freely, and in its rotations to carry with it the seed-rollers to deliver the seed from the roll-cases. On this square shaft, at proper intervals relatively with the seed-roll cases, are fixed slide-controlling heads $h$, fitted with an annular groove to receive the depending forked end of the seed-regulating slides $i$, which are fitted to slide endwise in suitable guideways in the upper face of the roll-cases in the bottom of the hopper, operating, as the shaft is moved in one or the other direction, to enlarge or lessen the aperture through which the seed from the hopper is admitted to the rollers to regulate the distribution of the seed.

At $k$ is represented a toothed rack fitted with a tubular bearing to receive the square shaft, to permit it to revolve therein freely, and is fixed thereto by means of suitable collars, to cause the shaft to conform to its endwise movements. This toothed rack is provided with a radial projecting arm, which enters the groove in the rear edge of the axle-beam, to hold the rack in position and permit it to slide therein with the endwise movements of the shaft.

$l$ represents a toothed sector, having its journal-bearing in the side of the seed-box in such position that its teeth shall engage the teeth of rack $k$, and to the outer end of its journal is fixed a lever-arm, $m$, by means of which the square shaft may be moved endwise in its bearings in the seeding-rollers, which movement will carry with it the controlling seed-slides $i$, to open and close the apertures to the seed-rollers.

At $n$ is represented a slotted segment having its under slotted edges beveled to receive the head of the screw-clamping bolt, which extends outward through the lever-arm $m$, and is fitted with a thumb-nut by which to clamp the lever-arm in position to the slotted segment when adjusted. This slotted segment is graduated to indicate the quantity of seed of several varieties which will be sown to a given area when the slides are adjusted as indicated on the segment.

At K is represented a shaft having an axial opening rectangular in cross-section, and is fitted to receive the end portion of the square shaft I in such a manner that the shaft will slide freely endwise therein, and by means of their corresponding rectangular form in cross-section will be made to revolve in unison. This hollow shaft K is supported to revolve in a bearing depending from the seed-box, and on its outward-projecting end portion is pivoted an angle-lever, L. The lower end of this angle-lever is provided with a suitable stud-journal projecting outward, on which is mounted to revolve thereon an intermediate toothed gear-wheel, $o$, the teeth of which engage the teeth of a pinion, $o'$, fixed on the outer end of the hollow shaft K, and the teeth of the intermediate gear-wheel, $o$, also engage the teeth of a driving-wheel, $o''$, fixed to the inner end of the hub of one of the carrying-wheels. The arrangement of these parts is such that in the forward movement of the machine motion will be transmitted from the carrying-wheel through the gear-train to the seeding-rollers to cause them to revolve in the direction to discharge the seed upward over the inclined edge of the rear opening in the seed-roll cases, and in the backward movement of the machine the action of the driving-gear fixed to the hub of the carrying-wheel will cause the intermediate gear-wheel to swing rearward, on its pivoted lever-support, out of connection with the driving-gear, and stop the motion of the seeding-rollers, and consequently the distribution of the seed.

The pivoted angle-lever L, on which is mounted the intermediate gear-wheel, is provided with a rear extension, to which is pivoted a supplemental arm, $p$, made adjustable by means of a thumb-screw bolt-connection, by which it may be fixed in position when adjusted. This supplemental arm is provided with a lateral arm, $r$, projecting from its inner face, and is designed to overlap the drag-bar M, which is of the usual form, carrying a drag-tooth, N, and is hinged to the machine at its forward end in the usual manner, to prevent lateral movement and permit of a free vertical movement of its rear end. In this instance I have represented but a single drag-bar and cultivator-tooth; but it is designed to provide the machine with a full series and to provide means for raising and holding them suspended, substantially in the same manner common in such machines. In raising the drag-bar to the position represented in dotted lines, when the supplemental arm $p$ is in the position represented in solid lines it will come in contact with the lateral arm r and will carry it to the position represented in dotted lines p', which movement will carry the intermediate gear-wheel to the position represented in dotted lines and disconnect it from the driving-gear and stop the distribution of the seed. If the supplemental arm p is put into the position represented in dotted lines at p'', the drag-bar may be raised and suspended in the position of the dotted lines, and not disconnect the seed mechanism or stop the distribution, in which instance the seeding device may be employed independent of the cultivator.

If the supplemental arm is put into position represented in the dotted lines at p''', its hook end will engage the hook r' on the rear portion of the mud-guard r'' and hold the gear-train disconnected and stop the distribution of seed, while the cultivators may be employed independent of the seeding mechanism.

I have also provided my improved seeding-machine with an odometer or land-measuring device, in which s represents a toothed gear-wheel mounted on the square shaft, to revolve therewith, and in such a manner as to permit the shaft to slide endwise through it. The teeth of this gear-wheel engage the teeth of gear-wheel s', fixed on the shaft s'', carrying a screw-gear, s''', which engages the teeth of a gear-wheel in a suitable gear-train to rotate a graduated dial, t, held in position on its journal-bearings in the gear-train by an index-finger, t', which engages the grooved end of its journal-bearing in such a manner that it may be turned to either side to permit the dial to be removed, adjusted, and replaced, and the finger again placed in its position on the end of the journal to prevent displacement. This arrangement will enable the operator to place the dial in position at any time without the use of tools. This dial may be so graduated as to indicate the area over which the seed has been distributed, or it may be graduated to indicate the distance the machine has traveled, or both distance traveled and area sown.

At P is represented a tool-box, placed in the hopper between its inner upper edges, at or near the center of its length, in which position it is fixed in such a manner as to prevent spreading of the sides from the pressure of the seed contained in the hopper. This box is designed as a receptacle to contain tools or articles which may be found convenient or necessary in using the machine. It is perforated or otherwise constructed of open-work to permit seed accidentally dropped therein to escape to the hopper.

At t'' is represented a bail-formed pawl, having the pivoted end portions of its arms supported in bearings formed in the tool-box in such a manner as to permit it to oscillate thereon.

R represents a hopper-lid supported on hinged connections in the usual manner, and is employed to close the hopper.

At u is represented a bracket, of a suitable form, fixed transversely to the lid in the center of its length. This bracket is provided with a cam-formed slot, u', which receives the free crown portion of the bail-formed pawl, to slide freely therein as the lid is raised or lowered. This cam-formed slot is provided with a hook-locking portion, u'', at its forward or lower end, into which the bail-formed pawl enters when the lid is raised, and serves to hold it in, or nearly in, a vertical position. From this upright position the lid may be readily closed by swinging the bail-formed pawl backward to disengage it from the hooking portion of the slot.

v represents a spring locking mechanism employed to lock the lid in its closed position. It is placed on the under side of the lid, and its depending hook-locking portion engages the rear portion of the tool-box, which serves as a locking strike-plate, and, in connection with the spring locking-hook, serves to hold the closed lid locked. A portion of this locking mechanism extends to the rear edge of the lid on its under side, which, when pressed down, will disengage the hook from its hold on the tool-box and permit the lid to be opened. This locking-hook in this instance is actuated by the spring v'.

In the drawings I have omitted some of the seed-regulating slides and some portions of the inclined bottoms of the hopper, for the purpose of more clearly showing its construction, which omissions are designed to be supplied by duplicates of the parts represented.

I have only represented a single drag-bar and cultivator-tooth; but it is intended to employ a full gang, and to employ a suitable device to raise and suspend the cultivators, substantially as and for the purpose common in this class of seeding-machines.

I claim as my invention—

1. In a seeding-machine, a feed-roll provided with large and small flutings, respectively formed thereon in transverse sections, said sections connecting together and constituting a continuous working-face, substantially as set forth.

2. In a seeding-machine, the combination, with a single roll-case, of a single feed-roll provided with two transverse sections of different-size flutings, respectively formed thereon, substantially as set forth.

3. In a seeding-machine, the combination, with a roll-case having a single compartment, of a feed-roll adapted to operate in said single compartment, and provided with two transverse fluting-sections, one section being composed of large flutings and the other section being composed of small flutings, substantially as set forth.

4. In a seeding-machine, the combination, with a feed-roll having its working-face formed in two transverse sections, said sections being respectively provided with different-sized flutings, of a roll-case formed in single compartment, and having the feed-roll with both said sections fitted therein, substantially as set forth.

5. In a seeding-machine, a feed-roll having its working-face formed in two transverse sections, respectively provided with different-sized flutings, said sections being formed continuously upon the roll, and the flutings of one section merging into the flutings of the other section, substantially as set forth.

6. In a seeding-machine, a feed-roll having its working-face formed in two transverse sections, respectively provided with different-sized flutings, the walls of the large flutings being extended to constitute walls for the small flutings, substantially as set forth.

7. In a seeding-machine, a feed-roll having its working-face formed in two transverse sections, the flutings of one section merging directly into the flutings of the other section, and being respectively twice the width thereof, substantially as set forth.

8. In a seeding-machine, a feed-roll having its working-face formed in two transverse sections, the flutings of one section being deeper than the flutings of the other section and communicating therewith, substantially as set forth.

9. In a seeding-machine, the combination, with an axle having its rear side provided with a longitudinal groove, of a two-part roll-case, the forward portions of both parts being provided with flanges which fit in said groove, and thereby secure the case in position, substantially as set forth.

10. In a seeding-machine, the combination, with an axle having its rear side provided with a longitudinal groove, of a two-part roll-case, the lower portion of the forward side of one part being provided with a flange, the upper portion of the forward side of the other part being provided with a flange, both said flanges being fitted in the groove, substantially as set forth.

11. In a seeding-machine, the combination, with an axle having its rear side provided with a longitudinal groove, of a two-part roll-case having flanges which fit in the groove, said roll-case parts having their rear portions secured together against lateral displacement, substantially as set forth.

12. In a seeding-machine, the combination, with an axle having its rear side provided with a longitudinal groove and a hopper mounted on the axle and projecting rearward thereof, of a roll-case having its forward portions provided with flanges which fit in said axle-groove, substantially as set forth.

13. In a seeding-machine, the combination, with a shaft adapted to rotate a feed-roll and to have independent longitudinal movement through it, of a valve which controls passage of the seed into the roll-case, and intermediate mechanism which connects said shaft and valve, substantially as described.

14. In a seeding-machine, the combination, with a shaft adapted to rotate a feed-roll and to have independent longitudinal movement, and an annularly-grooved collar fitted on the shaft, of a valve which controls the passage of seed into the roll-case, and is provided with a depending bifurcated arm which fits in the collar-groove, substantially as set forth.

15. In a seeding-machine, the combination, with a shaft adapted to rotate the feed-rolls and to have independent longitudinal movement, and sliding seed-valves, of intermediate mechanism which connect the latter with the shaft, and an index-lever which adjusts said shaft in its endwise movement, substantially as set forth.

16. In a seeding-machine, the combination, with a shaft adapted to rotate the feed-rolls and to have independent longitudinal movement, seed-valves, and intermediate mechanism which connect the latter with the shaft, of a rock-sleeve fitted on said shaft and a pinion-lever which meshes with the sleeve, substantially as set forth.

17. In a seeding-machine, the combination, with a shaft adapted to rotate the feed-rolls and to be longitudinally adjusted, seed-valves, and intermediate mechanism connecting the latter with the shaft, of a rock-sleeve fitted on said shaft, a pinion-lever meshing therewith, and a clamping device which secures said lever in desired adjustment, substantially as set forth.

18. In a seeding-machine, the combination, with a shaft adapted to rotate the feed-rolls and to have independent longitudinal adjustment, and a sleeve in which one extremity of the shaft is fitted, of a cog-wheel connected with the sleeve, and a second cog-wheel mounted on a pivoted lever and adapted to throw said sleeve in and out of gear connection with the carrying-wheel, substantially as set forth.

19. In a seeding-machine, the combination, with a shaft adapted to rotate a feed-roll and to have independent longitudinal movement, and a sleeve in which one extremity of the shaft is fitted, of a cog-wheel journaled on the sleeve-axle, and a cog-wheel mounted on a lever and adapted to connect and disconnect the sleeve-wheel with a cog-wheel rigidly secured to the carrying-wheel, substantially as set forth.

20. In a seeding-machine, the combination, with a shaft adapted to rotate the feed-rolls and to have independent longitudinal adjustment, a sleeve in which one extremity of the shaft is fitted, and a cog-wheel journaled on the sleeve-axle, of a lever having a tubular bearing which fits loosely over said axle, and a cog-wheel mounted on the lever and adapted to connect or disconnect the sleeve-wheel with a cog-wheel rigidly secured to the carrying-wheel, substantially as set forth.

21. In a seeding-machine, the combination, with a pivoted drag-bar, of a lever journaled on the feed-roller shaft, a gear-wheel keyed to said feed-roll shaft, a gear-wheel mounted on one end of said lever and arranged to mesh with the gear-wheel on the feed-roll shaft, a gear-wheel on the hub of the carrying-wheel, and a pendent arm adapted to be engaged by the drag-bar when raised and throw the feed-roller shaft out of gear with the carrying-wheel, substantially as set forth.

22. In a seeding-machine, the combination, with a pivoted drag-bar, of a lever provided with a gear-wheel which meshes with a gear-wheel on the feed-roller shaft and is adapted to be thrown in and out of gear with a gear-wheel on the hub of the carrying-wheel, and an adjustable pendent arm attached to one end of said lever, substantially as set forth.

23. The combination, with the free arm of the pivoted lever carrying the intermediate gear-wheel of the gear-train connecting the seed-rolls with the carrying-wheel, of a supplemental arm adjustably pivoted thereto, provided with an arm projecting laterally from its side to engage the drag-bar in its upward movement to stop the distribution of seed, substantially as and for the purpose hereinbefore set forth.

24. The herein-described supplemental arm, made vertically adjustable on its pivoted connection, to permit the drag-bars to be suspended in their elevated position and permit the distribution of seed independent of the use of the cultivators, as hereinbefore set forth.

25. The herein-described supplemental arm, made adjustable on its pivotal connection, to permit its hook-end portion to engage the hook-catch on the mud-guard to stop the distribution of seed independent of the use of the cultivators, substantially as hereinbefore set forth.

26. In a seeding-machine, the combination, with a rotary dial connected with a gear-train and an arbor on which it is mounted, of a pivotal index-finger which has bearing against said arbor, the parts being adapted to permit the dial to be removed from its arbor by turning the index-finger to one side, substantially as set forth.

27. In a seeding-machine, the combination, with a rotary dial connected to a gear-train and a dial-arbor having a grooved end, of a pivotal index-finger adapted to have its free extremity fit laterally in said arbor-groove, substantially as set forth.

28. In a seeding-machine, the combination, with a hopper, of a tool-box fitted transversely within the same and having its extremities respectively secured to opposite side walls of the hopper, said tool-box serving to prevent the hopper-walls from spreading apart under pressure of the seed, substantially as set forth.

29. In a seeding-machine, the combination, with a hopper, of a tool-box fitted transversely within the hopper and having its extremities respectively secured to the opposite side walls of the hopper, said tool-box being perforated to permit seed which may fall therein to pass into the hopper, substantially as set forth.

30. In a seeding-machine, the combination, with a hopper-lid provided with a slotted bracket having a recess in its lower side portion, of a tool-box fitted transversely within the hopper, and a V-shaped pawl whose arms are respectively pivoted to the opposite sides of said tool-box, the point of junction of said arms being adapted to lock with said recess when the lid is raised, substantially as set forth.

31. In a seeding-machine, the combination, with the hopper-lid, of a catch pivoted to the under side of the lid, said catch provided with a rear extension which engages with a spring, and provided with a forward extension which projects beyond the edge of the hopper and serves as a handle, substantially as set forth.

JAMES HERVA JONES.

Witnesses:
GEORGE A. SEALY,
A. O. BEHEL.